US011901575B2

(12) United States Patent
Xie et al.

(10) Patent No.: US 11,901,575 B2
(45) Date of Patent: Feb. 13, 2024

(54) BATTERY PACK AND POWER CONSUMING DEVICE

(71) Applicant: CONTEMPORARY AMPEREX TECHNOLOGY CO., LIMITED, Ningde (CN)

(72) Inventors: Tingzhen Xie, Ningde (CN); Shaocong Ouyang, Ningde (CN); Chenghua Fu, Ningde (CN); Baoyun Xu, Ningde (CN); Yunmei Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/465,172

(22) Filed: Sep. 12, 2023

(65) Prior Publication Data
US 2023/0420785 A1    Dec. 28, 2023

Related U.S. Application Data

(63) Continuation of application No. PCT/CN2022/075231, filed on Jan. 30, 2022.

(51) Int. Cl.
*H01M 50/267* (2021.01)
*H01M 50/209* (2021.01)
(Continued)

(52) U.S. Cl.
CPC ......... *H01M 50/267* (2021.01); *H01M 4/131* (2013.01); *H01M 4/134* (2013.01);
(Continued)

(58) Field of Classification Search
CPC ............. H01M 50/267; H01M 50/209; H01M 50/233; H01M 4/131; H01M 4/134; H01M 2004/028; H01M 2200/105
(Continued)

(56) References Cited

U.S. PATENT DOCUMENTS

2020/0381928 A1* 12/2020 Isaksson ............. H01M 50/249
2022/0021039 A1    1/2022 Bingham

FOREIGN PATENT DOCUMENTS

CN    206349469 U    7/2017
CN    110459825 A    11/2019
(Continued)

OTHER PUBLICATIONS

International Search Report received in the corresponding International Application PCT/CN2022/075231, dated Oct. 25, 2022.
(Continued)

*Primary Examiner* — James M Erwin
(74) *Attorney, Agent, or Firm* — Kilpatrick Townsend & Stockton LLP

(57) ABSTRACT

Provided are a battery pack and a power consuming device. The battery pack includes a battery pack case and a plurality of battery cells accommodated in the battery pack case. An inner space of the battery pack case may be divided into a first region located at the center and a second region enclosing the first region. The plurality of battery cells include: at least one first battery cell disposed in the first region; and at least one second battery cell disposed in the second region. An internal resistance of the first battery cell and an internal resistance of the second battery cell increase with the decrease of a temperature.

14 Claims, 3 Drawing Sheets

(51) Int. Cl.
  *H01M 50/233* (2021.01)
  *H01M 4/131* (2010.01)
  *H01M 4/134* (2010.01)
  *H01M 4/02* (2006.01)

(52) U.S. Cl.
  CPC ....... *H01M 50/209* (2021.01); *H01M 50/233* (2021.01); *H01M 2004/028* (2013.01); *H01M 2200/105* (2013.01); *H01M 2220/20* (2013.01)

(58) Field of Classification Search
  USPC .......................................................... 429/99
  See application file for complete search history.

(56) References Cited

FOREIGN PATENT DOCUMENTS

| | | |
|---|---|---|
| CN | 110911644 A | 3/2020 |
| CN | 111785925 A | 10/2020 |
| CN | 111965555 A | 11/2020 |
| JP | 2009302074 A | 12/2009 |

OTHER PUBLICATIONS

Written Opinion received in the corresponding International Application PCT/CN2022/075231, dated Oct. 25, 2022.

* cited by examiner

BATTERY PACK AND POWER CONSUMING DEVICE

CROSS-REFERENCE TO RELATED APPLICATIONS

This application is a continuation of International Application No. PCT/CN2022/075231, filed on Jan. 30, 2022.and entitled "BATTERY PACK AND POWER CONSUMING DEVICE", which is incorporated herein by reference in its entirety.

TECHNICAL FIELD

The present invention relates to the field of batteries, and in particular, to a battery pack with excellent charge and discharge performance at a low temperature and a power consuming device including the same.

BACKGROUND ART

In recent years, with the continuous development of technologies for secondary batteries such as lithium-ion batteries and sodium-ion batteries, the lithium-ion batteries and the sodium-ion batteries are widely applied in energy storage power systems such as hydroelectric, thermal, wind and solar power plants, as well as electric tools, electric bicycles, electric motorcycles, electric vehicles, military equipment, aerospace and other fields.

At present, energy storage batteries in electric vehicles and the like are mainly battery packs including lithium-ion secondary batteries. The lithium-ion secondary batteries used in the battery packs mainly include lithium iron phosphate batteries, ternary batteries containing nickel, cobalt, and manganese.

However, the lithium iron phosphate batteries and ternary batteries have poor dynamic performance at a low temperature (for example, in an extremely cold condition of below −20° C.) and high charge and discharge impedance. During charging, a large area of lithium precipitates at the negative electrodes, causing potential safety hazards. During discharging, there is not enough active lithium to be intercalated back to the positive electrodes, resulting in a large capacity loss. As a result, the charge and discharge performance of the battery pack including the lithium iron phosphate batteries or the ternary batteries at the low temperature needs to be improved. In addition, at the low temperature, battery cells arranged at an outer layer inside the battery pack dissipate heat quickly, while battery cells arranged at an inner layer dissipate heat slowly. There is a large temperature difference between the outer layer and the inner layer, and there is a great difference in the dynamic performance of the battery cells at the outer layer and the inner layer at the low temperature, thereby further reducing the charge and discharge performance of the battery pack as a whole at the low temperature.

SUMMARY OF THE INVENTION

The present invention is provided in view of the above technical problems, and an objective of the present invention is to provide a battery pack with excellent charge and discharge performance at a low temperature and a power consuming device including the same.

To achieve the above objective, a first aspect of the present application provides a battery pack, including a battery pack case and a plurality of battery cells accommodated in the battery pack case, where an inner space of the battery pack case may be divided into a first region located at the center and a second region enclosing the first region; and the plurality of battery cells include: at least one first battery cell disposed in the first region; and at least one second battery cell disposed in the second region. An internal resistance of the first battery cell and an internal resistance of the second battery cell increase with the decrease of a temperature. When the internal resistance of the first battery cell and the internal resistance of the second battery cell are respectively $R_{A1}$ and $R_{B1}$ at 25° C. and are respectively $R_{A2}$ and $R_{B2}$ at −20° C., $1 \leq R_{B1}/R_{A1} \leq 2$ and $1.2 \leq R_{B2}/R_{A2} \leq 2.5$, optionally, $1.3 \leq R_{B1}/R_{A1} \leq 1.6$ and $1.3 \leq R_{B2}/R_{A2} \leq 1.7$.

According to the battery pack in the first aspect of the present application, the first battery cell and the second battery cell whose internal resistances increase with the decrease of the temperature are provided in the inner space of the battery pack. According to $Q=I^2R$ (where Q represents heat, I represents a current, and R represents a resistance), when I is equal, the larger R is, the higher Q is. Therefore, the first battery cell 5 and the second battery cell 6 can generate heat quickly in an early stage when the internal resistances of positive electrode plates of the first battery cell and the second battery cell increase at the low temperature, and therefore the temperatures of the first battery cell 5 and the second battery cell 6 increase quickly. With the quick increase of the temperature, the impedance of the battery cells as a whole decreases, which can fundamentally improve the dynamic performance of the first battery cell 5 and the second battery cell 6, thereby avoiding potential safety hazards caused by lithium precipitation at the negative electrodes during charging due to poor dynamic performance of the battery cells at the low temperature. Meanwhile, the first battery cell and the second battery cell have low resistances at a normal temperature and a high temperature, which does not affect safe use at the normal temperature.

Moreover, in the battery pack in the first aspect of the present application, the first battery cell with a lower internal resistance at the low temperature is provided in the first region (an inner layer region) with slower heat dissipation, and the second battery cell with a higher internal resistance at the low temperature is provided in the second region (an outer layer region) with faster heat dissipation. At the low temperature, heat generated by the second battery cell in the second region (the outer layer region) is more than that generated by the first battery cell in the first region (the inner layer region). Enabling the internal resistances $R_{A1}$ and $R_{A2}$ of the first battery cell respectively at the room temperature (e.g. 25° C.) and the low temperature (e.g. −20° C.) and the internal resistances $R_{B1}$ and $R_{B2}$ of the second battery cell respectively at the room temperature and the low temperature to satisfy the above relationships can enable the temperature of the first region with slower heat dissipation and the temperature of the second region with faster heat dissipation in the battery pack to be approximately the same, which can make the dynamic performance of the second battery cell at an outer layer close to that of the first battery cell at an inner layer at the low temperature, thereby achieving the excellent charge and discharge performance of the battery pack as a whole at the low temperature.

The battery pack described in the present application is in any shape and may be designed into any shape as needed.

In a preferred implementation, $\Delta R_A \leq \Delta R_B \leq 7\Delta R_A$, where $\Delta R_A = R_{A2} - R_{A1}$ and $\Delta R_B = R_{B2} - R_{B1}$.

Enabling an increasing amount $\Delta R_B$ of the internal resistance of the second battery cell and an increasing amount $\Delta R_A$ of the internal resistance of the first battery cell to satisfy the above relationships when the temperature is reduced from 25° C. to −20° C. can enable heat generated by the second battery cell in the second region to be an appropriate amount more than that generated by the first battery cell in the first region, so that the temperature of the second region with faster heat dissipation can be roughly the same as that of the first region with slower heat dissipation, which further improves the charge and discharge performance of the battery pack as a whole at the low temperature.

In a preferred implementation, $0.1\ m\Omega \leq R_{A1} \leq 5\ m\Omega$ and $0.1\ m\Omega \leq R_{B1} \leq 5\ m\Omega$, optionally, $0.1\ m\Omega \leq R_{A1} \leq 1\ m\Omega$ and $0.1\ m\Omega \leq R_{B1} \leq 1\ m\Omega$.

$R_{A1}$ and $R_{B1}$ are enabled to be within the above ranges, so that the first battery cell and the second battery cell have lower resistances at the room temperature and the high temperature, and can be used more safely at the normal temperature.

In a preferred implementation, $1\ m\Omega \leq R_{A2} \leq 50\ m\Omega$ and $1\ m\Omega \leq R_{B2} \leq 50\ m\Omega$, optionally, $3\ m\Omega \leq R_{A2} \leq 8\ m\Omega$ and $R_{A2} \leq R_{B2} \leq 10\ m\Omega$.

$R_{A2}$ and $R_{B2}$ are enabled to be within the above ranges, so that each of the first battery cell and the second battery cell can generate a more appropriate amount of heat at the low temperature, which can further improve the charge and discharge performance of the battery pack as a whole at the low temperature.

In a preferred implementation, a ratio of a volume of the first region to a total volume of the first region and the second region ranges from 10% to 60%, optionally, 20% to 40%.

The ratio of the volume of the first region to the total volume of the first region and the second region is enabled to be within the above range, so that the first battery cell and the second battery cell with different internal resistances at the low temperature can be disposed according to temperature distribution in the battery pack under normal conditions.

In a preferred implementation, the first battery cell and the second battery cell include one or two or more of lithium iron phosphate batteries, ternary batteries, and sodium-ion batteries.

The effects of the present invention may be achieved as long as $R_{A1}$ and $R_{A2}$ of the first battery cell and $R_{B1}$ and $R_{B2}$ of the second battery cell in the battery pack satisfy the above relationships. The first battery cell and the second battery cell in the battery pack may be existing batteries such as lithium iron phosphate batteries, lithium-ion batteries such as ternary batteries, or sodium-ion batteries, or may be batteries other than these batteries. Certainly, to increase the internal resistances of the first battery cell and the second battery cell as the temperature decreases, these existing batteries may be treated to some extent.

In a preferred implementation, a positive electrode plate of each of the first battery cell and the second battery cell contains a negative temperature coefficient material, and the content of the negative temperature coefficient material in the positive electrode plate of the second battery cell is higher than that of the negative temperature coefficient material in the positive electrode plate of the first battery cell, where the content of the negative temperature coefficient material in the positive electrode plate=the mass of the negative temperature coefficient material in the positive electrode plate/(the mass of the positive electrode plate−the mass of a positive electrode current collector)×100%.

The negative temperature coefficient (NTC) material is a material whose resistance decreases as the temperature increases. The positive electrode plate of each of the first battery cell and the second battery cell is enabled to contain the negative temperature coefficient material (sometimes referred to as "NTC material" below) and the content of the NTC material in the positive electrode plate of the second battery cell is enabled to be higher, so that the first battery cell and the second battery cell whose internal resistances satisfy the above relationships can be easily obtained, and therefore the battery pack with excellent charge and discharge performance at the low temperature in the first aspect of the present application is obtained.

In a preferred implementation, the negative temperature coefficient material is doped in a positive electrode active material layer, or prepared into a coating to coat the positive electrode current collector or a surface of the positive electrode plate.

The effects of the present invention may be achieved as long as each of the first battery cell and the second battery cell contains an appropriate amount of the NTC material. The NTC material may be doped in the positive electrode active material layer, or the NTC material coating may be formed on the positive electrode current collector or the surface of the positive electrode plate. In addition, the NTC material coating may alternatively be formed on a surface of a separator where the separator is in direct contact with the positive electrode plate.

In a preferred implementation, the content a of the negative temperature coefficient material in the positive electrode plate of the first battery cell and the content b of the negative temperature coefficient material in the positive electrode plate of the second battery cell respectively meet $0 \leq a \leq 5\%$ and $5\% \leq b \leq 15\%$, optionally, $1\% \leq a \leq 2\%$ and $8\% \leq b \leq 10\%$.

When the content of the NTC material in the battery cells is within a specific range, the higher the content of the NTC material is, the higher the internal resistance of the battery cells at the low temperature is, the more the heat quickly generated by the battery cells in the early stage is, the faster the temperature of the battery cells rises, and the faster the impedance of the battery cells as a whole after the temperature rise decreases. However, the higher the content of the NTC material in the batteries, the higher the internal resistance of the batteries at the low temperature. When the content of the NTC material is higher than a specific value, a reduction speed of the impedance of the batteries as a whole gradually decreases with the increase of the content of the NTC material. When the content of the NTC material in the batteries is too high, the internal resistance of the battery cells is too high. With the increase of the content of the NTC material, the impedance of the battery cells as a whole does not decrease but increases, which leads to deterioration of the performance (for example, a capacity retention rate) of the battery cells.

Therefore, the content of the NTC material in the positive electrode plate of each of the first battery cell and the second battery cell needs to be properly set. The first battery cell is located in the inner layer region of the battery pack with slower heat dissipation and faster temperature rise, so that the content a of the NTC material in the positive electrode plate of the first battery cell is required to be lower. The second battery cell is located in the outer layer region of the battery pack with faster heat dissipation and slower temperature rise, so that the content b of the NTC material in the positive electrode plate of the second battery cell is required to be higher.

The contents of the NTC materials in the positive electrode plates of the first battery cell and the second battery cell are enabled to be within the above ranges, so that $R_{A1}$ and $R_{A2}$ of the first battery cell and $R_{B1}$ and $R_{B2}$ of the second battery cell can meet the above relationships, thereby ensuring that the battery pack in the present application has excellent charge and discharge performance at the low temperature.

In a preferred implementation, the negative temperature coefficient material is a compound composed of one or more metallic elements selected from Ti, V, Cr, Fe, Co, Ni, Mn, Cu, Sn, Y, Mo, Zr, W, La, Nd, and Yb and one or two non-metallic elements selected from P, F, C, O, and S.

Therefore, various existing NTC materials with high degree of freedom of selection can be used in the first battery cell and the second battery cell of the battery pack in the present application.

In a preferred implementation, the negative temperature coefficient material is $Mn_{1.5}Co_{1.2}Ni_{0.3}O_4$, $Fe_{0.2}Mn_{2.2}Ni_{0.6}O_4$, $NiMn_{1.6}Mg_{0.4}O_4$, $Mn_{1.4}Co_{0.9}Ni_{0.7}O_4$, or $Mn_{1.6}Co_{0.4}CuO_4$ doped with $0.1RuO_2$.

Therefore, common NTC materials can be used in the first battery cell and the second battery cell of the battery pack in the present application.

In a preferred implementation, the number of first battery cells in the first region accounts for 50% or more, optionally, 80% or more of the total number of battery cells in the first region.

Enabling the number of first battery cells in the first region to account for 50% or more of the total number of battery cells in the first region can achieve the effects of improving the charge and discharge performance of the battery pack as a whole at the low temperature. The first battery cell disposed in the first region has higher cost than common battery cells (battery cells free from the NTC material and whose internal resistance increases with temperature rise). The higher the percentage of the number of first battery cells in the first region, the better the above effects, but the higher the cost. Within a range in which the effects of the present invention can be achieved, the percentage of the number of first battery cells in the first region in the total number of battery cells in the first region is enabled to be within an appropriate range, so that the low-temperature charge and discharge performance and cost of the battery pack can be taken into consideration.

In a preferred implementation, the number of second battery cells in the second region accounts for 50% or more, optionally, 80% or more of the total number of battery cells in the second region.

The number of second battery cells in the second region is enabled to account for 50% or more of the total number of battery cells in the second region, so that the effect of the charge and discharge performance of the battery pack as a whole at the low temperature can be improved. The second battery cell disposed in the second region has higher cost than common battery cells (battery cells free from the NTC material and whose internal resistance increases with temperature rise). The higher the percentage of the number of second battery cells in the second region, the better the above effects, but the higher the cost. Within a range in which the effects of the present invention can be achieved, the percentage of the number of second battery cells in the second region in the total number of battery cells in the second region is enabled to be within an appropriate range, so that the low-temperature charge and discharge performance and cost of the battery pack can be taken into consideration.

A second aspect of the present application provides a power consuming device including the battery pack in the first aspect of the present application.

The power consuming device in the second aspect of the present application includes the battery pack with excellent charge and discharge performance at the low temperature in the first aspect of the present application, so that it can be normally used for a long time at the low temperature.

Invention Effects

The present invention can provide the battery pack with excellent charge and discharge performance at the low temperature and the power consuming device including the same.

LIST OF REFERENCE SIGNS

Figure 1:
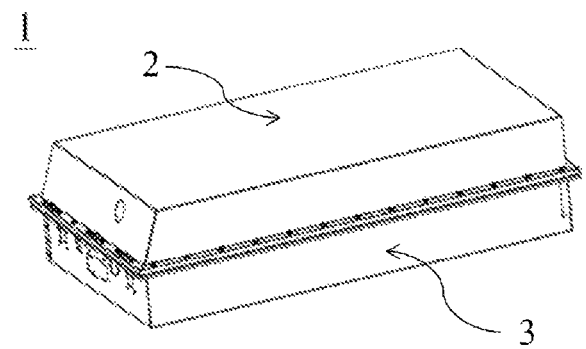
FIG. 1 is a schematic diagram of an overall structure of a battery pack after assembly according to an implementation of the present application.

1: battery pack; 2: upper case body; 3: lower case body; BL1: first boundary line; BL2: second boundary line; R1: first region; R2: second region; 5: first battery cell; 6: second battery cell; 51: housing; 52: electrode assembly; and 53: cover plate.

DETAILED DESCRIPTION OF EMBODIMENTS

Hereafter, implementations of the battery pack and power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between 0 and 5 have been listed herein, and "0-5" is just an abbreviated representation of combinations of these numerical values. In addition, when a parameter is expressed as an integer being≥2, it is equivalent to disclosing that the parameter is, for example, an integer of 2, 3, 4, 5, 6, 7, 8, 9, 10, 11, 12, or the like.

All the implementations and optional implementations of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), or steps (c), (a) and (b).

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

At present, from the development of a market form, a battery pack including lithium-ion secondary batteries has been used more and more widely in the field of power batteries. With the continuous expansion of the application field of the power batteries, the market demand for the power batteries is also expanding.

The inventor of the present application notes that lithium iron phosphate batteries and ternary batteries commonly used in lithium-ion secondary batteries have poor dynamic performance at a low temperature (for example, in an extremely cold condition of below −20° C.), and high charge and discharge impedance. During charging, a large area of lithium precipitates at the negative electrodes, causing potential safety hazards. During discharging, there is not enough active lithium to be intercalated back to the positive electrodes, resulting in a large capacity loss. As a result, the charge and discharge performance of the battery pack including the lithium iron phosphate batteries or the ternary batteries at the low temperature needs to be improved.

In addition, the inventor of the present application further notes that, at the low temperature, battery cells arranged at an outer layer inside the battery pack dissipate heat quickly, while battery cells arranged at an inner layer dissipate heat slowly. There is a large temperature difference between the outer layer and the inner layer, and there is a great difference in the dynamic performance of the battery cells at the outer layer and the inner layer at the low temperature, thereby further reducing the charge and discharge performance of the battery pack as a whole at the low temperature.

Therefore, the inventor of the present application thought that if the temperature of battery cells in the battery pack is increased at the low temperature to improve the dynamic performance of the battery pack, the above problems during charging and discharging can be prevented. Furthermore, if the temperature of battery cells at the outer layer with faster heat dissipation is increased more quickly at the low temperature, the temperatures of an outer layer region and an inner layer region of the battery pack can be roughly the same, which can make the dynamic performance of the battery cells in the outer layer region close to that of the battery cells in the inner layer region, thereby improving the charge and discharge performance of the battery pack as a whole at the low temperature.

To achieve the above objective, the inventor of the present application has carried out research repeatedly, and found that heat is generated in battery cells when a current flows therein. The larger an internal resistance of the battery cells, the more the heat generated, and the higher the temperature of the battery cells. Therefore, enabling the internal resistance of battery cells in the battery pack to increase with the decrease of the temperature, and enabling the internal resistance of the battery cells provided in the outer layer region of the battery pack with faster heat dissipation and lower temperature to be higher at the low temperature can solve the above problems well and achieve excellent charge and discharge performance of the battery pack as a whole at the low temperature.

Battery Pack

A battery pack in the present application is specifically described below.

Figure 2:
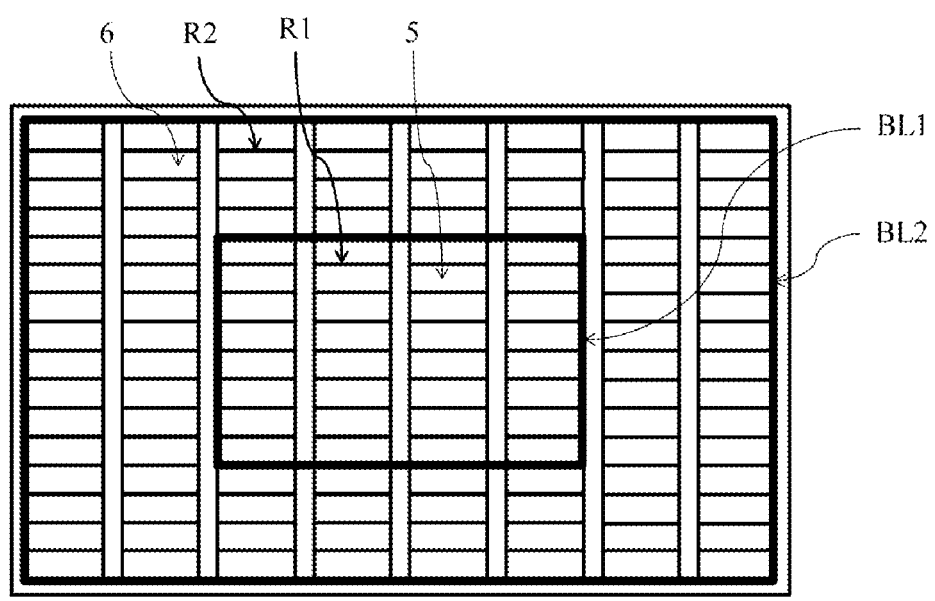
FIG. 2 is a schematic diagram indicating division of a first region and a second region in an inner space of a battery pack case shown in FIG. 1 according to an implementation of the present application.

FIG. 1 is a schematic diagram of an overall structure of a battery pack after assembly according to an implementation of the present application. FIG. 2 is a schematic diagram indicating division of a first region and a second region in an inner space of a battery pack case shown in FIG. 1 according to an implementation of the present application.

As shown in FIG. 1 and FIG. 2, the battery pack 1 of the present application includes a battery case and a plurality of battery cells (5 and 6) provided in the battery case. The battery case includes an upper case body 2 and a lower case body 3. The upper case body 2 can cover the lower case body 3 to form an enclosed space (a battery pack cavity) for accommodating the plurality of battery cells.

As shown in FIG. 2, an inner space of the battery pack case is in a substantially rectangular shape and includes a first region R1 and a second region R2. The first region R1 is a substantially rectangular region enclosed by a first boundary line BL1, and is located at the center of the rectangular shape of the inner space of the battery pack case (for example, a length and a width of the rectangular shape of the first region R1 may be respectively approximately halves of a length and a width of the rectangular shape of the inner space of the battery pack case). The second region R2 is a substantially annular region enclosing the first region R1 and defined by the first boundary line BL1 and a second boundary line BL2. The first boundary line BL1 and the second boundary line BL2 are imaginary lines drawn to clearly define the first region R1 and the second region R2.

At least one first battery cell 5 is disposed in the first region R1, at least one second battery cell 6 is disposed in the second region R2, and second battery cells 6 are arranged around the first battery cell 5. An internal resistance of the first battery cell 5 and an internal resistance of the second battery cell 6 increase with the decrease of a temperature. When the internal resistance of the first battery cell 5 and the internal resistance of the second battery cell 6 are respectively $R_{A1}$ and $R_{B1}$ at 25° C. and are respectively $R_{A2}$ and $R_{B2}$ at −20° C., $1 \leq R_{B1}/R_{A1} \leq 2$ and $1.2 \leq R_{B2}/R_{A2} \leq 2.5$, optionally, $1.3 \leq R_{B1}/R_{A1} \leq 1.6$ and $1.3 \leq R_{B2}/R_{A2} \leq 1.7$.

In the present application, the first battery cell 5 and the second battery cell 6 whose internal resistances increase with the decrease of the temperature are provided in the inner space of the battery pack case. According to $Q=I^2R$ (where Q represents heat, I represents a current, and R represents a resistance), when I is equal, the larger R is, the higher Q is. Therefore, the first battery cell and the second battery cell can generate heat quickly in an early stage when the internal resistances of positive electrode plates of the first battery cell and the second battery cell increase at the low temperature, and therefore the temperatures of the first battery cell and the second battery cell increase quickly. With the quick increase of the temperature, the impedance of the battery cells as a whole decreases, which can fundamentally improve the dynamic performance of the first battery cell 5 and the second battery cell 6, thereby avoiding potential safety hazards caused by lithium precipitation at the negative electrodes during charging due to poor dynamic performance of the battery cells at the low temperature. Meanwhile, the first battery cell 5 and the second battery cell 6 have low resistances at a normal temperature and a high temperature, which does not affect safe use at the normal temperature.

Moreover, in the battery pack of the present application, the first battery cell 5 with a lower internal resistance at the low temperature is provided in the first region (an inner layer region) R1 with slower heat dissipation, and the second battery cell 6 with a higher internal resistance at the low temperature is provided in the second region (an outer layer region) R2 with faster heat dissipation. Therefore, at the low temperature, heat generated by the second battery cell 6 in the second region (the outer layer region) R2 is more than that generated by the first battery cell 5 in the first region (the inner layer region) R1. Enabling the internal resistances $R_{A1}$ and $R_{A2}$ of the first battery cell 5 respectively at the room temperature (e.g. 25° C.) and the low temperature (e.g. −20° C.) and the internal resistances $R_{B1}$ and $R_{B2}$ of the second battery cell 6 respectively at the room temperature and the low temperature to satisfy the above relationships can enable the temperature of the first region R1 with slower heat dissipation and the temperature of the second region R2 with faster heat dissipation in the battery pack to be approximately the same, which can make the dynamic performance of the second battery cell 6 at an outer layer close to that of the first battery cell 5 at an inner layer at the low temperature, thereby achieving excellent charge and discharge performance of the battery pack 1 as a whole at the low temperature.

In some implementations, $\Delta R_A \leq \Delta R_B \leq 7\Delta R_A$, where $\Delta R_A = R_{A2} - R_{A1}$ and $\Delta R_B = R_{B2} - R_{B1}$.

Enabling an increasing amount $\Delta R_B$ of the internal resistance of the second battery cell 6 and an increasing amount $\Delta R_A$ of the internal resistance of the first battery cell 5 to satisfy the above relationships when the temperature is reduced from 25° C. to −20° C. can enable heat generated by the second battery cell 6 in the second region R2 to be an appropriate amount more than that generated by the first battery cell 5 in the first region R1, so that the temperature of the second region R2 with faster heat dissipation can be roughly the same as that of the first region R1 with slower heat dissipation, which further improves the charge and discharge performance of the battery pack 1 as a whole at the low temperature.

In some implementations, $0.1 \text{ m}\Omega \leq R_{A1} \leq 5 \text{ m}\Omega$ and $0.1 \text{ m}\Omega \leq R_{B1} \leq 5 \text{ m}\Omega$, optionally, $0.1 \text{ m}\Omega \leq R_{A1} \leq 1 \text{ m}\Omega$ and $0.1 \text{ m}\Omega \leq R_{B1} \leq 1 \text{ m}\Omega$.

$R_{A1}$ and $R_{B1}$ are enabled to be within the above ranges, so that the first battery cell 5 and the second battery cell 6 have lower resistances at the room temperature and the high temperature, and can be used more safely at the normal temperature.

In some implementations, $1 \text{ m}\Omega \leq R_{A2} \leq 50 \text{ m}\Omega$ and $1 \text{ m}\Omega \leq R_{B2} \leq 50 \text{ m}\Omega$, optionally, $3 \text{ m}\Omega \leq R_{A2} \leq 8 \text{ m}\Omega$ and $R_{A2} \leq R_{B2}$ 10 m$\Omega$.

$R_{A2}$ and $R_{B2}$ are enabled to be within the above ranges, so that each of the first battery cell 5 and the second battery cell 6 can generate a more appropriate amount of heat at the low temperature, which can further improve the charge and discharge performance of the battery pack 1 as a whole at the low temperature.

In some implementations, a ratio of a volume of the first region R1 to a total volume of the first region R1 and the second region R2 ranges from 10% to 60%, optionally, 20% to 40%.

The ratio of the volume of the first region R1 to the total volume of the first region R1 and the second region R2 is enabled to be within the above range, so that the first battery cell 5 and the second battery cell 6 with different internal resistances at the low temperature can be disposed according to temperature distribution in the battery pack under normal conditions.

In some implementations, the first battery cell 5 and the second battery cell 6 include one or two or more of lithium iron phosphate batteries, ternary batteries, and sodium-ion batteries.

The effects of the present invention may be achieved as long as $R_{A1}$ and $R_{A2}$ of the first battery cell 5 and $R_{B1}$ and $R_{B2}$ of the second battery cell 6 in the battery pack 1 satisfy the above relationships. The first battery cell 5 and the second battery cell 6 in the battery pack 1 may be existing batteries such as lithium iron phosphate batteries, lithium-ion batteries such as ternary batteries, or sodium-ion batteries, or may be batteries other than these batteries. Certainly, to increase the internal resistances of the first battery cell 5 and the second battery cell 6 as the temperature decreases, these existing batteries may be treated to some extent.

In some implementations, a positive electrode plate of each of the first battery cell 5 and the second battery cell 6 contains a negative temperature coefficient material, and the content of the negative temperature coefficient material in the positive electrode plate of the second battery cell 6 is higher than that of the negative temperature coefficient material in the positive electrode plate of the first battery cell 5, where the content of the negative temperature coefficient material in the positive electrode plate=the mass of the negative temperature coefficient material in the positive electrode plate/(the mass of the positive electrode plate−the mass of a positive electrode current collector)×100%.

As described above, the negative temperature coefficient (NTC) material is a material whose resistance decreases as the temperature increases. The positive electrode plate of each of the first battery cell 5 and the second battery cell 6 is enabled to contain the NTC material and the content of the NTC material in the positive electrode plate of the second battery cell 6 is enabled to be higher, so that the first battery cell 5 and the second battery cell 6 whose internal resistances satisfy the above relationships can be easily obtained, and therefore the battery pack 1 with excellent charge and discharge performance at the low temperature in the present application is obtained.

The NTC material in the present application is not specifically limited, and all materials that are suitable for use in batteries and have the characteristics that resistances decrease with temperature rise may be used. It may be a common NTC material contained in the positive electrode plate, or a positive electrode active material with the NTC characteristic after specific treatment.

In some implementations, the negative temperature coefficient material is doped in a positive electrode active material layer, or prepared into a coating to coat the positive electrode current collector or a surface of the positive electrode plate.

The effects of the present invention may be achieved as long as each of the first battery cell 5 and the second battery cell 6 contains the NTC material appropriately. The NTC material may be doped in the positive electrode active material layer, or the NTC material coating may be formed on the positive electrode current collector or the surface of the positive electrode plate. In addition, the NTC material coating may alternatively be formed on a surface of a separator where the separator is in direct contact with the positive electrode plate.

In some implementations, the content a of the negative temperature coefficient material in the positive electrode plate of the first battery cell 5 and the content b of the negative temperature coefficient material in the positive electrode plate of the second battery cell 6 respectively meet $0 \leq a \leq 5\%$ and $5\% \leq b \leq 15\%$, optionally, $1\% \leq a \leq 2\%$ and $8\% \leq b \leq 10\%$.

When the content of the NTC material in the battery cells is within a specific range, the higher the content of the NTC material is, the higher the internal resistance of the battery cells at the low temperature is, the more the heat quickly generated by the battery cells in the early stage is, the faster the temperature of the battery cells rises, and the faster the impedance of the battery cells as a whole after the temperature rise decreases. However, the higher the content of the NTC material in the batteries, the higher the internal resistance of the batteries at the low temperature. When the content of the NTC material is higher than a specific value, a reduction speed of the impedance of the batteries as a whole gradually decreases with the increase of the content of the NTC material. When the content of the NTC material in the batteries is too high, the internal resistance of the battery cells is too high. With the increase of the content of the NTC material, the impedance of the battery cells as a whole does not decrease but increases, which leads to deterioration of the performance (for example, a capacity retention rate) of the battery cells.

Therefore, the content of the NTC material in the positive electrode plate of each of the first battery cell 5 and the second battery cell 6 needs to be properly set. The first battery cell 5 is located in the inner layer region of the battery pack with slower heat dissipation and faster temperature rise, so that the content a of the NTC material in the positive electrode plate of the first battery cell is required to be lower. The second battery cell 6 is located in the outer layer region of the battery pack with faster heat dissipation and slower temperature rise, so that the content b of the NTC material in the positive electrode plate of the second battery cell is required to be higher.

The contents of the negative temperature coefficient materials in the positive electrode plates of the first battery cell 5 and the second battery cell 6 are enabled to be within the above ranges, which can ensure that the battery pack 1 in the present application has excellent charge and discharge performance at the low temperature.

In some implementations, the negative temperature coefficient material is a compound composed of one or more metallic elements selected from Ti, V, Cr, Fe, Co, Ni, Mn, Cu, Sn, Y, Mo, Zr, W, La, Nd, and Yb and one or two non-metallic elements selected from P, F, C, O, and S.

Therefore, various existing NTC materials with high degree of freedom of selection can be used in the first battery cell 5 and the second battery cell 6 of the battery pack 1 in the present application.

In some implementations, the negative temperature coefficient material is $Mn_{1.5}Co_{1.2}Ni_{0.3}O_4$, $Fe_{0.2}Mn_{2.2}Ni_{0.6}O_4$, $NiMn_{1.6}Mg_{0.4}O_4$, $Mn_{1.4}Co_{0.9}Ni_{0.7}O_4$, or $Mn_{1.6}Co_{0.4}CuO_4$ doped with $0.1RuO_2$.

Therefore, common NTC materials can be used in the first battery cell 5 and the second battery cell 6 of the battery pack 1 in the present application.

In some implementations, the number of first battery cells 5 in the first region R1 accounts for 50% or more, optionally, 80% or more of the total number of battery cells in the first region R1.

Enabling the number of first battery cells 5 in the first region R1 to account for 50% or more of the total number of battery cells in the first region can achieve the effects of improving the charge and discharge performance of the battery pack 1 as a whole at the low temperature. The first battery cell 5 disposed in the first region R1 has higher cost than common battery cells (battery cells free from the NTC material and whose internal resistance increases with temperature rise). The higher the percentage of the number of first battery cells 5 in the first region R1, the better the above effects, but the higher the cost. Within a range in which the effects of the present invention can be achieved, the percentage of the number of first battery cells 5 in the first region R1 in the total number of battery cells in the first region is enabled to be within an appropriate range, so that the low-temperature charge and discharge performance and cost of the battery pack 1 can be taken into consideration.

In some implementations, the number of second battery cells 6 in the second region R2 accounts for 50% or more, optionally, 80% or more of the total number of battery cells in the second region.

The number of second battery cells 6 in the second region R2 is enabled to account for 50% or more of the total number of battery cells in the second region, so that the effect of the charge and discharge performance of the battery pack 1 as a whole at the low temperature can be improved. The second battery cell 6 disposed in the second region R2 has higher cost than common battery cells (battery cells free from the NTC material and whose internal resistance increases with temperature rise). The higher the percentage of the number of second battery cells 6 in the second region R2, the better the above effects, but the higher the cost. Within a range in which the effects of the present invention can be achieved, the percentage of the number of second battery cells 6 in the second region R2 in the total number of battery cells in the second region is enabled to be within an appropriate range, so that the low-temperature charge and discharge performance and cost of the battery pack 1 can be taken into consideration.

Hereinafter, the battery cells (the first battery cell 5 and the second battery cell 6) used in the battery pack 1 of the present application will be described in detail.

The battery cell used in the battery pack 1 of the present application is a secondary battery. Typically, a secondary battery includes a positive electrode plate, a negative electrode plate, an electrolyte, and a separator. During charging/discharging of the battery, active ions are intercalated and de-intercalated back and forth between a positive electrode plate and a negative electrode plate. The electrolyte serves to conduct ions between the positive electrode plate and the negative electrode plate. The separator is provided between the positive electrode plate and the negative electrode plate, and mainly prevents the positive and negative electrodes from short-circuiting and enables the ions to pass through.

[Positive Electrode Plate]

The positive electrode plate includes a positive electrode current collector and a positive film layer provided on at least one surface of the positive electrode current collector, the positive film layer including a positive electrode active material.

As an example, the positive electrode current collector has two surfaces opposite in its own thickness direction, and the positive film layer is provided on either or both of the two opposite surfaces of the positive electrode current collector.

In some implementations, the positive electrode current collector may be a metal foil or a composite current collector. For example, as the metal foil, an aluminum foil may be used. The composite current collector may include a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some implementations, the positive electrode active material may be a positive electrode active material known in the art for batteries. As an example, the positive electrode active material may include at least one of the following materials: lithium-containing phosphates of an olivine structure, lithium transition metal oxides, and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}MnO_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some implementations, the positive film layer further optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some implementations, the positive film layer further optionally includes a conductive agent. As an example, the conductive agent may include at least one of superconducting carbon, acetylene black, carbon black, Ketjen black, carbon dots, carbon nanotubes, graphene, and carbon nanofibers.

In some implementations, the positive electrode plate may be prepared as follows: dispersing the above-described components for preparing the positive electrode plate, such as the positive electrode active material, the conductive agent, the binder, and any other components, in a solvent (e.g., N-methylpyrrolidone) to form a positive electrode slurry; and coating the positive electrode current collector with the positive electrode slurry, followed by procedures such as drying and cold pressing, so as to obtain the positive electrode plate.

[Negative Electrode Plate]

The negative electrode plate includes a negative electrode current collector and a negative film layer provided on at least one surface of the negative electrode current collector, the negative film layer including a negative electrode active material.

As an example, the negative electrode current collector has two surfaces opposite in its own thickness direction, and the negative film layer is provided on either or both of the two opposite surfaces of the negative electrode current collector.

In some implementations, the negative electrode current collector may be a metal foil or a composite current collector. For example, as the metal foil, a copper foil may be used. The composite current collector may include a polymer material substrate and a metal layer formed on at least one surface of the polymer material substrate. The composite current collector may be formed by forming a metal material (copper, a copper alloy, nickel, a nickel alloy, titanium, a titanium alloy, silver, a silver alloy, etc.) on the polymer material substrate (e.g., polypropylene (PP), polyethylene terephthalate (PET), polybutylene terephthalate (PBT), polystyrene (PS), polyethylene (PE), etc.).

In some implementations, the negative electrode active material may be a negative electrode active material known in the art for batteries. As an example, the negative electrode active material may include at least one of the following materials: artificial graphite, natural graphite, soft carbon, hard carbon, a silicon-based material, a tin-based material, lithium titanate, etc. The silicon-based material may be selected from at least one of elemental silicon, silicon oxides, silicon carbon composites, silicon nitrogen composites, and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some implementations, the negative film layer further optionally includes a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some implementations, the negative film layer further optionally includes a conductive agent. The conductive agent may be selected from at least one of superconductive carbon, acetylene black, carbon black, Ketjen black, carbon dots, carbon nanotubes, graphene, and carbon nanofibers.

In some implementations, the negative electrode film layer may optionally include other auxiliary agents, such as thickener (e.g. sodium carboxymethyl cellulose (CMC-Na)) and the like.

In some implementations, the negative electrode plate may be prepared as follows: dispersing the above-mentioned components for preparing the negative electrode plate, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode plate.

[Electrolyte]

The electrolyte serves to conduct ions between the positive electrode plate and the negative electrode plate. The type of the electrolyte is not specifically limited in the present application, and may be selected according to requirements. For example, the electrolyte may be in a liquid state, a gel state or an all-solid state.

In some implementations, the electrolyte is an electrolyte solution. The electrolyte solution includes an electrolyte salt and a solvent.

In some implementations, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate, and lithium tetrafluorooxalate phosphate.

In some implementations, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some implementations, the electrolytic solution may optionally include an additive. For example, the additive may include a negative electrode film-forming additive and a positive electrode film-forming additive, and may further include an additive that can improve certain performances of the battery, such as an additive that improves the overcharge performance of the battery, or an additive that improves the high-temperature or low-temperature performance of the battery.

[Separator]

In some implementations, the secondary battery further includes a separator. The type of the separator is not particularly limited in the present application, and any well known porous-structure separator with good chemical stability and mechanical stability may be selected.

In some implementations, the material of the separator may be selected from at least one of glass fibers, non-woven fabrics, polyethylene, polypropylene and polyvinylidene fluoride. The separator may be a single-layer film or a multi-layer composite film, and is not limited particularly. When the separator is a multi-layer composite film, the materials in the respective layers may be same or different, which is not limited particularly.

In some implementations, the positive electrode plate, the negative electrode plate, and the separator may be prepared into the electrode assembly through a winding process or a stacking process.

In some implementations, the secondary battery may include an outer package. The outer package may be used to encapsulate the above-mentioned electrode assembly and electrolyte.

In some implementations, the outer package of the secondary battery may be a hard shell, such as a hard plastic shell, an aluminum shell, or a steel shell. The outer package of the secondary battery may alternatively be a soft package, such as a pouch-type soft package. The material of the soft package may be plastics, and the examples of plastics may include polypropylene, polybutylene terephthalate, and polybutylene succinate, etc.

Figure 3:
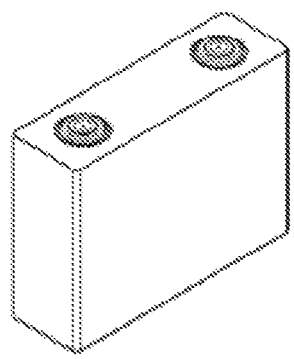
FIG. 3 is a schematic diagram of a battery cell according to an implementation of the present application.

A shape of the battery cell (secondary battery) is not particularly limited in the present application, and may be cylindrical, square, or in any other shape. For example, FIG. 3 shows a first battery cell 5 of a square structure as an example (herein, the first battery cell 5 is taken as an example for description, and the same is true for the second battery cell 6).

Figure 4:
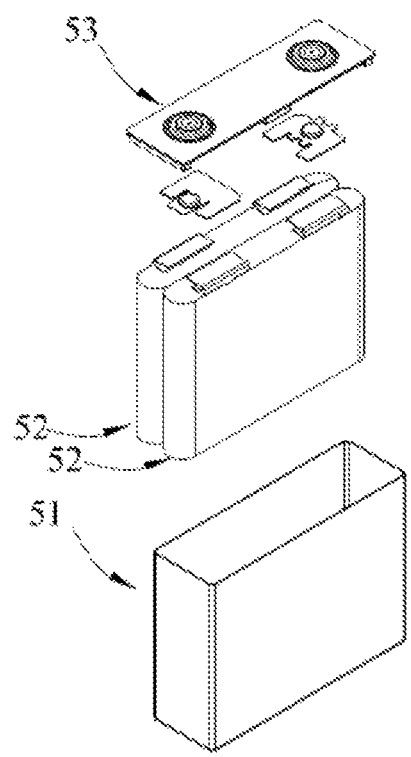
FIG. 4 is an exploded view of the battery cell shown in FIG. 3 according to an implementation of the present application.

In some implementations, referring to FIG. 4, the outer package may include a housing 51 and a cover plate 53. Herein, the housing 51 may include a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate, and the separator may be subjected to a winding process or a stacking process to form an electrode assembly 52. The electrode assembly 52 is encapsulated in the accommodating cavity. The electrolyte solution is infiltrated into the electrode assembly 52. One or more electrode assemblies 52 may be contained in the first battery cell 5, and may be selected by those skilled in the art according to actual requirements.

In some implementations, at least one first battery cell 5 and at least one second battery cell 6 may be assembled into a battery pack 1, and the specific numbers of first battery cells 5 and second battery cells 6 contained in the battery pack 1 may be selected according to the application and capacity of the battery pack.

Power Consuming Device

In addition, the present application further provides a power consuming device including the battery pack of the present application. The battery pack may be used as power source of the power consuming device, or may be used as an energy storage unit of the power consuming device. The power consuming device may include a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf cart, or an electric truck), an electric train, ship, and satellite, and an energy storage system, but is not limited thereto.

The battery cell or battery pack may be selected according to usage requirements of the power consuming device.

Figure 5:
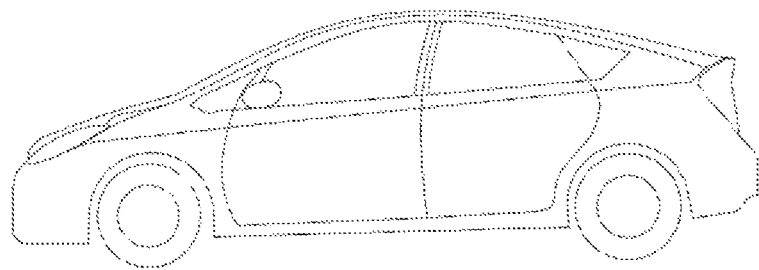
FIG. 5 is a schematic diagram of a power consuming device using a battery pack according to an implementation of the present application as a power supply.

FIG. 5 shows a power consuming device as an example. The power consuming device may be a battery electric vehicle, a hybrid electric vehicle, a plug-in hybrid electric vehicle, or the like. In order to meet requirements of the power consuming device for low-temperature endurance, the battery pack of the present application may be used.

EXAMPLES

The examples of the present application are described below. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

I. Preparation of Battery Cells

I. Preparation of First Battery Cells

Preparation Example I-1

(1) Preparation of a Positive Electrode Plate

Lithium iron phosphate ($LiFePO_4$) as a positive electrode active material, superconducting carbon black SP as a conductive agent, and polyvinylidene fluoride (PVDF) as a binder are dispersed in N-methylpyrrolidone (NMP) as a solvent in a mass ratio of 95:3:2 and are mixed uniformly to obtain a positive electrode slurry; and after being coated with the positive electrode slurry, positive electrode current collector aluminum foil is then dried, cold pressed, slit, and cut to obtain the positive electrode plate.

(2) Preparation of a Negative Electrode Plate

Graphite as a negative electrode active material, superconducting carbon black SP as a conductive agent, SBR as a binder, and CMC-Na as a thickener are dispersed in deionized water as a solvent in a mass ratio of 96:1:1:2 and are mixed uniformly to obtain a negative electrode slurry; a negative electrode current collector copper foil is evenly coated with the negative electrode slurry; and the negative electrode current collector copper foil is dried, cold pressed, slit, and cut to obtain a negative electrode plate.

(3) Separator

A polyethylene film is selected as a separator.

(4) Preparation of an Electrolyte Solution

Ethylene carbonate (EC), dimethyl carbonate (DMC), and diethyl carbonate (DEC) are mixed in a volume ratio of 1:1:1 into an organic solvent, and then the fully dried lithium salt $LiPF_6$ is dissolved in the mixed organic solvent, so as to prepare an electrolyte solution with a concentration of 1 mol/L.

(5) Preparation of Battery Cells

The above positive electrode plate, separator, and negative electrode plate are stacked in sequence, such that the separator is located between the positive electrode plate and the negative electrode plate to play a role of isolation, and are then wound to obtain a bare cell; and the bare cell is placed in an outer packaging case, dried, and injected with the electrolyte, and is then subjected to procedures such as vacuum packaging, standing, forming, and shaping, to obtain a first battery cell I-1.

Preparation Example I-2

A first battery cell I-2 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ as a negative temperature coefficient material are dispersed in N-methylpyrrolidone (NMP) as a solvent in a mass ratio of 94:3:2:1 and are mixed uniformly to obtain a positive electrode slurry.

Preparation Example I-3

A first battery cell I-3 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 93:3:2:2 and are mixed uniformly to obtain a positive electrode slurry.

Preparation Example I-4

A first battery cell I-4 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 92:3:2:3 and are mixed uniformly to obtain a positive electrode slurry.

Preparation Example I-5

A first battery cell I-5 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 91:3:2:4 and are mixed uniformly to obtain a positive electrode slurry.

Preparation Example I-6

A first battery cell I-6 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 90:3:2:5 and are mixed uniformly to obtain a positive electrode slurry.

Preparation Example I-7

A first battery cell I-7 is obtained in the same operations as in Preparation example I-1, except that when a positive electrode plate is prepared, $LiNi_{0.6}Co_{0.2}Mn_{0.2}O_2$ as a positive electrode active material, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 94:3:2:1 and are mixed uniformly to obtain a positive electrode slurry.

Preparation Example I-8

A first battery cell I-8 is obtained in the same operations as in Preparation example I-1, except that when a positive electrode plate is prepared, $Na_3V_2(PO_4)_2O_2F$ as a positive electrode active material, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 93:3:2:2 and are mixed uniformly to obtain a positive electrode slurry.

Preparation Example I-9

A first battery cell I-9 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are Dispersed in N-Methylpyrrolidone (NMP) as a Solvent in a Mass Ratio of 89:3:2:6 and are mixed uniformly to obtain a positive electrode slurry.

2. Preparation of Second Battery Cells

Preparation Example II-1

A second battery cell II-1 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 90:3:2:5 and are mixed uniformly to obtain a positive electrode slurry.

Preparation Example II-2

A second battery cell II-2 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 89:3:2:6 and are mixed uniformly to obtain a positive electrode slurry.

Preparation Example II-3

A second battery cell II-3 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 87:3:2:8 and are mixed uniformly to obtain a positive electrode slurry.

Preparation Example II-4

A second battery cell II-4 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 85:3:2:10 and are mixed uniformly to obtain a positive electrode slurry.

Preparation Example II-5

A second battery cell II-5 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 81:3:2:14 and are mixed uniformly to obtain a positive electrode slurry.

Preparation Example II-6

A second battery cell II-6 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 80:3:2:15 and are mixed uniformly to obtain a positive electrode slurry.

Preparation Example II-7

A second battery cell II-7 is obtained in the same operations as in Preparation example I-1, except that when a positive electrode plate is prepared, $LiNi_{0.6}Co_{0.2}Mn_{0.2}O_2$ as a positive electrode active material, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 87:3:2:8 and are mixed uniformly to obtain a positive electrode slurry.

Preparation Example II-8

A second battery cell II-8 is obtained in the same operations as in Preparation example I-1, except that when a positive electrode plate is prepared, $Na_3V_2(PO_4)_2O_2F$ as a positive electrode active material, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 85:3:2:10 and are mixed uniformly to obtain a positive electrode slurry.

Preparation Example II-9

A second battery cell II-9 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 91:3:2:4 and are mixed uniformly to obtain a positive electrode slurry.

Preparation Example II-10

A second battery cell II-10 is obtained in the same operations as in Preparation example I-1, except that when a positive electrode plate is prepared, $LiFePO_4$, superconducting carbon black SP, polyvinylidene fluoride, and $Mn_{1.5}Co_{1.2}Ni_{0.3}O_4$ are dispersed in N-methylpyrrolidone (NMP) as a solvent in a mass ratio of 79:3:2:16 and are mixed uniformly to obtain a positive electrode slurry.

II. Assembly of a Battery Pack

Example 1

As shown in FIG. 2, an inner space of a battery pack case is divided into a first region R1 a second region R2, the first battery cell I-1 is provided in the first region R1 as the first battery cell 5, and the second battery cell II-1 is provided in the second region R2 as the second battery cell 6, to be assembled into the battery pack.

In FIG. 2, a ratio of a volume of the first region R1 to a total volume of the first region R1 and the second region R2 is about 25%.

The number of first battery cells I-1 in the first region R1 accounts for 100% of the total number of battery cells in the first region R1, and the number of second battery cells II-1 in the second region R2 accounts for 100% of the total number of battery cells in the second region R2.

Example 2

A battery pack is assembled in the same operations as in Example 1, except that the first battery cell I-2 is used instead of the first battery cell I-1.

Example 3

A battery pack is assembled in the same operations as in Example 1, except that the first battery cell I-2 is used instead of the first battery cell I-1 and the second battery cell II-2 is used instead of the second battery cell II-1.

Example 4

A battery pack is assembled in the same operations as in Example 1, except that the first battery cell I-2 is used instead of the first battery cell I-1 and the second battery cell II-3 is used instead of the second battery cell II-1.

Example 5

A battery pack is assembled in the same operations as in Example 1, except that the first battery cell I-2 is used instead of the first battery cell I-1 and the second battery cell II-4 is used instead of the second battery cell II-1.

Example 6

A battery pack is assembled in the same operations as in Example 1, except that the first battery cell I-2 is used instead of the first battery cell I-1 and the second battery cell II-5 is used instead of the second battery cell II-1.

Example 7

A battery pack is assembled in the same operations as in Example 1, except that the first battery cell I-2 is used instead of the first battery cell I-1 and the second battery cell II-6 is used instead of the second battery cell II-1.

Example 8

A battery pack is assembled in the same operations as in Example 1, except that the second battery cell II-3 is used instead of the second battery cell II-1.

Example 9

A battery pack is assembled in the same operations as in Example 1, except that the first battery cell I-3 is used instead of the first battery cell I-1 and the second battery cell II-3 is used instead of the second battery cell II-1.

Example 10

A battery pack is assembled in the same operations as in Example 1, except that the first battery cell I-4 is used instead of the first battery cell I-1 and the second battery cell II-3 is used instead of the second battery cell II-1.

Example 11

A battery pack is assembled in the same operations as in Example 1, except that the first battery cell I-5 is used instead of the first battery cell I-1 and the second battery cell II-3 is used instead of the second battery cell II-1.

Example 12

A battery pack is assembled in the same operations as in Example 1, except that the first battery cell I-6 is used instead of the first battery cell I-1 and the second battery cell II-3 is used instead of the second battery cell II-1.

Example 13

A battery pack is assembled in the same operations as in Example 1, except that the first battery cell I-3 is used instead of the first battery cell I-1, the second battery cell II-3 is used instead of the second battery cell II-1, and the number of first battery cells I-3 in the first region R1 accounts for 80% of the total number of battery cells in the first region R1 (the remaining 20% of the battery cells in the first region R1 are first battery cells I-1 free from the NTC material).

Example 14

A battery pack is assembled in the same operations as in Example 13, except that the number of first battery cells I-3 in the first region R1 accounts for 50% of the total number of battery cells in the first region R1 (the remaining 50% of the battery cells in the first region R1 are first battery cells I-1 free from the NTC material).

Example 15

A battery pack is assembled in the same operations as in Example 12, except that the number of second battery cells II-3 in the second region R2 accounts for 80% of the total number of battery cells in the second region R2 (the remaining 20% of the battery cells in the second region R2 are first battery cells I-1 free from the NTC material).

Example 16

A battery pack is assembled in the same operations as in Example 12, except that the number of second battery cells II-3 in the second region R2 accounts for 50% of the total number of battery cells in the second region R2 (the remaining 50% of the battery cells in the second region R2 are first battery cells I-1 free from the negative temperature coefficient material).

Comparative Example 1

A battery pack is assembled in the same operations as in Example 1, except that the first battery cell I-9 is used instead of the first battery cell I-1 and the second battery cell II-3 is used instead of the second battery cell II-1.

Comparative Example 2

A battery pack is assembled in the same operations as in Example 1, except that the first battery cell I-9 is used instead of the first battery cell I-1 and the second battery cell II-9 is used instead of the second battery cell II-1.

Comparative Example 3

A battery pack is assembled in the same operations as in Example 1, except that the first battery cell I-9 is used instead of the first battery cell I-1 and the second battery cell II-10 is used instead of the second battery cell II-1.

Comparative Example 4

A battery pack is assembled in the same operations as in Example 1, except that the first battery cell I-3 is used instead of the first battery cell I-1 and the second battery cell II-9 is used instead of the second battery cell II-1.

Comparative Example 5

A battery pack is assembled in the same operations as in Example 1, except that the first battery cell I-3 is used instead of the first battery cell I-1 and the second battery cell II-10 is used instead of the second battery cell II-1.

III. Performance Test Results of the Battery Cells and the Battery Pack

1. Performance Test Results of the Battery Cells

The first battery cells I-1 to I-9 and the second battery cells II-1 to II-10 are respectively subjected to measurement of internal resistances of the battery cells, a test for charge performance at −20° C., and a test for discharge performance at −20° C.

(1) Measurement of Internal Resistances of the Battery Cells

A battery cell with a housing size of length×width× height=70.5 mm×194 mm×111.5 mm and a capacity of 195 Ah is measured.

The capacity of the battery cell is adjusted to enable a value of state of charge (SOC) to be 50%: In an environment of 25° C., the battery cell is charged/discharged at a constant rate of ⅓ C (1 C=the rated capacity of the battery cell), with a charge/discharge voltage ranging from 2.0 V to 3.8 V. This step is repeated three times, and a discharge capacity obtained at the third time is recorded as the nominal capacity Cn of the battery cell. The battery cell is charged at ⅓ Cn to half of the nominal capacity, and the SOC of the battery cell is adjusted to 50%.

The internal resistances of the battery cell during charging respectively at 25° C. and −20° C. are measured: In the environment of 25° C., the battery cell is charged at 4 Cn for 30s, voltages before and after charging are respectively recorded as V0 and V1, and a value of (V1-V0)/(4 Cn) is used as the corresponding internal resistance of the battery cell during charging at 25° C. In an environment of −20° C., the battery cell is charged at 0.36 Cn for 30s, voltages before and after charging are respectively recorded as V2 and V3, and a value of (V3-V2)/(0.36 Cn) is used as the corresponding internal resistance of the battery cell during charging at −20° C.

(2) Test for Cycling Performance at −20° C.

A battery cell using the LFP system is let stand for 120 min at −20° C., then charged with a constant current of 0.3 C to have an upper limit voltage of 3.8 V, further charged with a constant voltage of 3.8 V to have a current of 0.05 C, let stand for 30 min, and discharged with the constant current of 0.3 C to have a voltage of 2.0 V. This is one charge and discharge cycle. This process is repeated for the battery cell for n cycles (n≥1). A trend of a capacity retention rate and a ratio of a charge capacity to a discharge capacity (a C/D value) in the cycles is observed. When the capacity retention rate declines rapidly or even drops precipitously, and the C/D value increases rapidly, it indicates that the battery has high probability of precipitation of metal (lithium or sodium), and the battery cell needs to be disassembled to observe the interface for auxiliary determining.

The battery cell after low-temperature cycle is let stand at 25° C. for 120 min, and the battery cell is charged with the constant current of ⅓ C to have the voltage of 3.8 V. In an environment of a drying room, the battery cell charged to have the voltage of 3.8 V is disassembled to observe the precipitation of metal (lithium or sodium) on the surface of the negative electrode. Herein, a precipitation degree includes no precipitation, slight precipitation, moderate precipitation, and severe precipitation. The slight precipitation means that a metal precipitation region on the surface of the negative electrode is 1/10 or less of an overall region. The severe precipitation means that the precipitation region on the surface of the negative electrode exceeds ⅓ of the overall region.

(3) Test for Discharge Performance at −20° C.

A battery cell using the LFP system is first discharged at the rate of ⅓ C at 25° C., with the charge/discharge voltage ranging from 2.0 V to 3.8 V, the initial discharge capacity C0 is determined by measurement, and then the battery cell enters the low-temperature cycle at −20° C. The battery cell is let stand for 120 min, charged with the constant current of 0.3 C to have the upper limit voltage of 3.8 V, further charged with the constant voltage of 3.8 V to have the current of 0.05 C, let stand for 30 min, and then is discharged with the constant current of 0.3 C to have the voltage of 2.0 V. This is one charge and discharge cycle. This process is repeated for the battery cell for 50n cycles (n≥1). After every 50 low-temperature cycles, the discharge capacities C1, C2, . . . , Cn are determined by measurement again at 25° C.

The capacity retention rate (%) of the battery cell in the discharge cycle at −20° C. is equal to Cn/C0 * 100%.

Test results for internal resistances of the first battery cells I-1 to I-9 and test results for the charge/discharge performance of the battery cells at −20° C. are shown in Table 1 together with positive electrode compositions.

TABLE 1

Positive electrode composition, internal resistance test results, and charge/discharge test results of first battery cells

| First battery cell | Positive electrode active material | Content a of the NTC material in the positive electrode plate | Internal resistance $R_{A1}$ at 25° C. (mΩ) | Internal resistance $R_{A2}$ at −20° C. (mΩ) | $\Delta R_A = R_{A2} - R_{A1}$ (mΩ) | Precipitation after 200 cycles at −20° C. | Discharge capacity retention rate after 200 cycles at −20° C. |
|---|---|---|---|---|---|---|---|
| I-1 | LiFePO$_4$ | 0 | 0.368 | 4.86 | 4.492 | Severe precipitation | 70.60% |

TABLE 1-continued

Positive electrode composition, internal resistance test results, and charge/discharge test results of first battery cells

| First battery cell | Positive electrode active material | Content a of the NTC material in the positive electrode plate | Internal resistance $R_{A1}$ at 25° C. (mΩ) | Internal resistance $R_{A2}$ at −20° C. (mΩ) | $\Delta R_A = R_{A2} - R_{A1}$ (mΩ) | Precipitation after 200 cycles at −20° C. | Discharge capacity retention rate after 200 cycles at −20° C. |
|---|---|---|---|---|---|---|---|
| I-2 | LiFePO$_4$ | 1% | 0.384 | 4.98 | 4.596 | Severe precipitation | 71.20% |
| I-3 | LiFePO$_4$ | 2% | 0.402 | 5.43 | 5.028 | Severe precipitation | 72.30% |
| I-4 | LiFePO$_4$ | 3% | 0.423 | 5.58 | 5.157 | Moderate precipitation | 73.80% |
| I-5 | LiFePO$_4$ | 4% | 0.445 | 5.72 | 5.275 | Moderate precipitation | 74.50% |
| I-6 | LiFePO$_4$ | 5% | 0.467 | 5.96 | 5.493 | Slight precipitation | 76.80% |
| I-7 | LiNi$_{0.6}$Co$_{0.2}$Mn$_{0.2}$O$_2$ | 1% | 0.262 | 5.07 | 4.808 | Severe precipitation | 70.70% |
| I-8 | Na$_3$V$_2$(PO$_4$)$_2$O$_2$F | 2% | 0.412 | 5.78 | 5.368 | Severe precipitation | 71.80% |
| I-9 | LiFePO$_4$ | 6% | 0.486 | 6.18 | 5.694 | Slight precipitation | 78.20% |

In addition, test results for internal resistances of the second battery cells II-1 to II-10 and test results for the charge/discharge performance of the battery cells at −20° C. are shown in Table 2 together with the positive electrode compositions.

TABLE 2

Positive electrode composition, internal resistance test results, and charge/discharge test results of second battery cells

| Second battery cell | Positive electrode active material | Content a of the NTC material in the positive electrode plate | Internal resistance $R_{B1}$ at 25° C. (mΩ) | Internal resistance $R_{B2}$ at −20° C. (mΩ) | $\Delta R_B = R_{B2} - R_{B1}$ (mΩ) | Precipitation after 200 cycles at −20° C. | Discharge capacity retention rate after 200 cycles at −20° C. |
|---|---|---|---|---|---|---|---|
| II-1 | LiFePO$_4$ | 5% | 0.467 | 5.96 | 5.493 | Slight precipitation | 76.80% |
| II-2 | LiFePO$_4$ | 6% | 0.486 | 6.18 | 5.694 | Slight precipitation | 78.20% |
| II-3 | LiFePO$_4$ | 8% | 0.538 | 7.32 | 6.782 | No precipitation | 81.60% |
| II-4 | LiFePO$_4$ | 10% | 0.587 | 8.42 | 7.833 | No precipitation | 79.50% |
| II-5 | LiFePO$_4$ | 14% | 0.684 | 9.58 | 8.896 | Moderate precipitation | 73.80% |
| II-6 | LiFePO$_4$ | 15% | 0.725 | 9.83 | 9.105 | Moderate precipitation | 71.50% |
| II-7 | LiNi$_{0.6}$Co$_{0.2}$Mn$_{0.2}$O$_2$ | 8% | 0.514 | 7.32 | 6.806 | Slight precipitation | 79.60% |
| II-8 | Na$_3$V$_2$(PO$_4$)$_2$O$_2$F | 10% | 0.584 | 8.52 | 7.936 | Slight precipitation | 78.10% |
| II-9 | LiFePO$_4$ | 4% | 0.445 | 5.72 | 5.275 | Moderate precipitation | 74.50% |
| II-10 | LiFePO$_4$ | 16% | 1.12 | 10.12 | 9 | Severe precipitation | 70.40% |

2. Performance Test Results of the Battery Pack

For each battery pack in Examples 1 to 16 and Comparative examples 1 to 5, a Neware power battery tester (Model BTS-5V300A-4CH) is used to measure total full discharge energy of the battery pack at 25° C. and total full discharge energy of the battery pack at −20° C., and the total full discharge energy of the battery pack at −20° C. is divided by the total full discharge energy of the battery pack at 25° C. to calculate the total energy retention rate (%) of the battery pack at −20° C.

The measurement of the total full discharge energy of the battery pack at 25° C. is carried out in accordance with section "7.1.2 Capacity and energy test at room temperature" in "Lithium-ion Traction Battery Pack and System for Electric Vehicles-Part 2: Test Specification for High Energy Applications" in GB/T 31467.2-2015.

The measurement of the total full discharge energy of the battery pack at −20° C. is carried out in accordance with section "7.1.4 Capacity and energy test at low temperature" in "Lithium-ion Traction Battery Pack and System for Electric Vehicles-Part 2: Test Specification for High Energy Applications" in GB/T 31467.2-2015.

Compositions and test results of the battery packs in Examples 1 to 16 and Comparative examples 1 to 5 are shown in Table 3 below.

TABLE 3

Composition and performance parameters of battery packs in the Examples and Comparative examples

| Battery pack | First battery cell | Second battery cell | Percentage of the number of first battery cells in the first region | Percentage of the number of second battery cells in the second region | $R_{B1}/R_{A1}$ | $R_{B2}/R_{A2}$ | $\Delta R_B/\Delta R_A$ | Total energy retention rate of the battery pack at −20° C. |
|---|---|---|---|---|---|---|---|---|
| Example 1 | I-1 | II-1 | 100% | 100% | 1.27 | 1.23 | 1.22 | 77.10% |
| Example 2 | I-2 | II-1 | 100% | 100% | 1.22 | 1.20 | 1.20 | 78.20% |
| Example 3 | I-2 | II-2 | 100% | 100% | 1.27 | 1.24 | 1.24 | 82.70% |
| Example 4 | I-2 | II-3 | 100% | 100% | 1.40 | 1.47 | 1.48 | 85.40% |
| Example 5 | I-2 | II-4 | 100% | 100% | 1.53 | 1.69 | 1.70 | 83.60% |
| Example 6 | I-2 | II-5 | 100% | 100% | 1.78 | 1.92 | 1.94 | 77.60% |
| Example 7 | I-2 | II-6 | 100% | 100% | 1.89 | 1.97 | 1.98 | 76.80% |
| Example 8 | I-1 | II-3 | 100% | 100% | 1.46 | 1.51 | 1.51 | 82.50% |
| Example 9 | I-3 | II-3 | 100% | 100% | 1.34 | 1.35 | 1.35 | 81.30% |
| Example 10 | I-4 | II-3 | 100% | 100% | 1.27 | 1.31 | 1.32 | 79.40% |
| Example 11 | I-5 | II-3 | 100% | 100% | 1.21 | 1.28 | 1.29 | 78.60% |
| Example 12 | I-6 | II-3 | 100% | 100% | 1.15 | 1.23 | 1.23 | 77.90% |
| Example 13 | I-3 | II-3 | 80% | 100% | 1.34 | 1.35 | 1.35 | 79.20% |
| Example 14 | I-3 | II-3 | 50% | 100% | 1.34 | 1.35 | 1.35 | 78.70% |
| Example 15 | I-3 | II-3 | 100% | 80% | 1.34 | 1.35 | 1.35 | 78.90% |
| Example 16 | I-3 | II-3 | 100% | 50% | 1.34 | 1.35 | 1.35 | 77.60% |
| Comparative example 1 | I-1 | II-10 | 100% | 100% | 3.04 | 2.08 | 2.00 | 76.50% |
| Comparative example 2 | I-1 | II-9 | 100% | 100% | 1.21 | 1.18 | 1.17 | 75.10% |
| Comparative example 3 | I-9 | II-3 | 100% | 100% | 1.11 | 1.18 | 1.19 | 74.80% |
| Comparative example 4 | I-9 | II-10 | 100% | 100% | 2.30 | 1.64 | 1.58 | 74.30% |
| Comparative example 5 | I-6 | II-10 | 100% | 100% | 2.40 | 1.70 | 1.64 | 75.00% |

According to the results in Table 1 above, for the first battery cells I-1 to I-8 in which the content a of the NTC material in the positive electrode plates meets 0≤a≤500 the internal resistance $R_{A1}$ at 25° C. meets 0.1 mΩ≤$R_{A1}$≤1 mΩ, and the internal resistance $R_{A2}$ at −20° C. meets 3 mΩ≤$R_{A2}$≤8 mΩ. The lithium precipitation of the first battery cells I-1 to I-8 after 200 cycles at −20° C. is gradually improved with the increase of the content of the NTC material, and the capacity retention rate thereof after 200 cycles at −20° C. ranges from 70.60% to 78.20%. For the first battery cell I-9 in which the content a of the NTC material in the positive electrode plate is 6%, $R_{A1}$=0.486 mΩ and $R_{A2}$=6.18 mΩ. Although the above relationships are satisfied, because the first battery cell is actually located in the first region (the inner layer region) of the battery pack, the heating requirement may be met when the content a of the NTC material ranges from 0% to 5%, and the excessively high impedance will cause the capacity retention rate to decrease when the content a exceeds 5%.

It should be noted that Table 1 above shows test results for only the first battery cells. When the first battery cells and the second battery cells are assembled into the battery pack, the first battery cells are arranged in the inner layer region of the battery pack. Compared to the test for only the first battery cells, the heat dissipation and the temperature rise are different, and the performance is also different. For example, during the test for only the first battery cell I-2 with the content of the NTC material of 1%, the battery cell is placed at the outermost layer with fastest heat dissipation, and severe precipitation occurs. However, when assembled with the second battery cell into the battery pack, the first battery cell I-2 is arranged in the inner layer region with slow heat dissipation and fast temperature rise, and no precipitation occurs.

According to the results in Table 2 above, for the second battery cells II-1 to II-8 in which the content b of the NTC material in the positive electrode plates meets 5%≤b≤15%, the internal resistance $R_{B1}$ at 25° C. meets 0.1 mΩ≤$R_{B1}$≤1 mΩ, and the internal resistance $R_{B2}$ at −20° C. meets 5 mΩ≤$R_{B2}$≤10 mΩ. Lithium precipitation does not occur on the second battery cells II-1 to II-8 during charging at −20° C., and the capacity retention rate of the second battery cells during discharging at −20° C. ranges from 71.50% to 81.60%. For the second battery cell II-10 in which the content b of the NTC material in the positive electrode plate is 16%, $R_{B2}$=10.12 mΩ and $R_{B2}$ >10 mΩ. When the above relationships are not satisfied, severe lithium precipitation occurs on the second battery cell II-10 during charging at −20° C., and the capacity retention rate of the second battery cell during discharging at −20° C. is 70.40%.

According to the results in Table 3 above, in Examples 1 to 16, $R_{B1}/R_{A1}$ and $R_{B2}/R_{A2}$ of the first battery cells and the second battery cells used meet the above relationships specified in the present application. As mentioned above, slight lithium precipitation occurs or lithium precipitation does not occur during charging at −20° C., and the total energy retention rate of the battery pack at −20° C. ranges from 76.80% to 85.40%.

In Comparative examples 1 to 5, $R_{B1}/R_{A1}$ and $R_{B2}/R_{A2}$ of the first battery cells and the second battery cells used do not meet the above relationships specified in the present application. As mentioned above, moderate or severe lithium precipitation occurs during charging at −20° C., and the total energy retention rate of the battery pack at −20° C. ranges from 74.30% to 76.50%.

It should be noted that the present application is not limited to the above implementations. The above implementations are exemplary only, and any implementation that has substantially same constitutions as the technical ideas and has the same effects within the scope of the technical solution of the present application falls within the technical scope of the present application. In addition, without departing from the gist of the present application, various modifications that can be conceived by those skilled in the art to the implementations, and other modes constructed by combining some of the constituent elements of the implementations also fall within the scope of the present application.

The invention claimed is:

1. A battery pack, comprising a battery pack case and a plurality of battery cells accommodated in the battery pack case, wherein
an inner space of the battery pack case may be divided into a first region located at the center and a second region enclosing the first region; and
the plurality of battery cells comprise: at least one first battery cell disposed in the first region; and at least one second battery cell disposed in the second region, wherein
an internal resistance of the first battery cell and an internal resistance of the second battery cell increase with the decrease of a temperature, and when the internal resistance of the first battery cell and the internal resistance of the second battery cell are respectively $R_{A1}$ and $R_{B1}$ at 25° C. and are respectively $R_{A2}$ and $R_{B2}$ at −20° C., $1 \leq R_{B1}/R_{A1} \leq 2$ and $1.2 \leq R_{B2}/R_{A2} \leq 2.5$, optionally, $1.3 \leq R_{B1}/R_{A1} \leq 1.6$ and $1.3 \leq R_{B2}/R_{A2} \leq 1.7$.

2. The battery pack according to claim 1, wherein $\Delta R_A \leq \Delta R_B \leq 7\Delta R_A$, wherein $\Delta R_A = R_{A2} - R_{A1}$ and $\Delta R_B = R_{B2} - R_{B1}$.

3. The battery pack according to claim 1, wherein $0.1\ m\Omega \leq R_{A1} \leq 5\ m\Omega$ and $0.1\ m\Omega \leq R_{B1}\ 5\ m\Omega$.

4. The battery pack according to claim 1, wherein $1\ m\Omega \leq R_{A2} \leq 50\ m\Omega$ and $1\ m\Omega \leq R_{B2} \leq 50\ m\Omega$.

5. The battery pack according to claim 1, wherein a ratio of a volume of the first region to a total volume of the first region and the second region ranges from 10% to 60%.

6. The battery pack according to claim 1, wherein the first battery cell and the second battery cell comprise one or two or more of lithium iron phosphate batteries, ternary batteries, and sodium-ion batteries.

7. The battery pack according to claim 1, wherein
a positive electrode plate of each of the first battery cell and the second battery cell contains a negative temperature coefficient material, and
the content of the negative temperature coefficient material in the positive electrode plate of the second battery cell is higher than that of the negative temperature coefficient material in the positive electrode plate of the first battery cell,
wherein the content of the negative temperature coefficient material in the positive electrode plate=the mass of the negative temperature coefficient material in the positive electrode plate/(the mass of the positive electrode plate−the mass of a positive electrode current collector)×100%.

8. The battery pack according to claim 7, wherein
the negative temperature coefficient material is doped in a positive electrode active material layer, or prepared into a coating to coat the positive electrode current collector or a surface of the positive electrode plate.

9. The battery pack according to claim 7, wherein
the content of the negative temperature coefficient material in the positive electrode plate of the first battery cell and the content b of the negative temperature coefficient material in the positive electrode plate of the second battery cell respectively meet $0 \leq a \leq 5\%$ and $5\% \leq b \leq 15\%$.

10. The battery pack according to claim 7, wherein
the negative temperature coefficient material is a compound composed of one or more metallic elements selected from Ti, V, Cr, Fe, Co, Ni, Mn, Cu, Sn, Y, Mo, Zr, W, La, Nd, and Yb and one or two non-metallic elements selected from P, F, C, O, and S.

11. The battery pack according to claim 10, wherein
the negative temperature coefficient material is $Mn_{1.5}Co_{1.2}Ni_{0.3}O_4$, $Fe_{0.2}Mn_{2.2}Ni_{0.6}O_4$, $NiMn_{1.6}Mg_{0.4}O_4$, $Mn_{1.4}Co_{0.9}Ni_{0.7}O_4$, or $Mn_{1.6}Co_{0.4}CuO_4$ doped with $0.1RuO_2$.

12. The battery pack according to claim 1, wherein the number of first battery cells in the first region accounts for 50% or more.

13. The battery pack according to claim 1, wherein the number of second battery cells in the second region accounts for 50% or more.

14. A power consuming device comprising the battery pack according to claim 1.